United States Patent [19]

Nagata et al.

[11] Patent Number: 5,039,214

[45] Date of Patent: Aug. 13, 1991

[54] REFLECTION TYPE OPTICAL APPARATUS

[75] Inventors: Shin-ichi Nagata; Yoshinori Sezaki; Tomiji Hotta, all of Kyoto, Japan

[73] Assignee: Dainippon Screen Mfg. Co., Ltd., Japan

[21] Appl. No.: 333,464

[22] Filed: Apr. 5, 1989

[30] Foreign Application Priority Data

Apr. 5, 1988 [JP] Japan .................................. 63-84639

[51] Int. Cl.⁵ ........................ G02B 21/06; G02B 5/22
[52] U.S. Cl. .................................. 359/386; 359/389; 359/888
[58] Field of Search ............... 350/377, 382, 383, 385, 350/388–389, 396, 236, 320, 321, 524–527, 507–511, 521–528, 370–385; 356/400, 401; 250/578; 355/43, 53

[56] References Cited

U.S. PATENT DOCUMENTS

| | | | |
|---|---|---|---|
| 2,944,463 | 7/1960 | Räntsch | 350/524 |
| 3,853,398 | 12/1974 | Kano | 350/524 |
| 3,926,500 | 12/1975 | Frosch et al. | 350/527 |
| 4,062,623 | 12/1977 | Suzuki et al. | 350/236 |
| 4,599,000 | 7/1986 | Yamada | 356/400 |
| 4,634,240 | 1/1987 | Suzuki et al. | 350/527 |
| 4,694,186 | 9/1987 | Onoda et al. | 250/578 |
| 4,814,829 | 3/1989 | Kosugi et al. | 355/43 |

Primary Examiner—Bruce Y. Arnold
Assistant Examiner—Thong Nguyen
Attorney, Agent, or Firm—Ostrolenk, Faber, Gerb & Soffen

[57] ABSTRACT

A beam splitter, a first polarizing plate and a quarter-wave plate are provided in that order on the optical axis of an image formation lens between an image formation plane and an objective lens. The first polarizing plate comprises a non-polarizing region for transmitting illuminating light and reflected light and a polarizing region provided to enclose the non-polarizing region for transmitting the illuminating light but limiting the reflected light which is rendered out of phase with the illuminating light by the quarterwave plate. Thus, the angular aperture of the illuminating light can be increased and an irradiated plane can be observed with no hindrance even if the same is inferior in flatness, while illuminance of the irradiated plane can be sufficiently ensured. At the same time, the angular aperture of the objective lens can be reduced, and the depth of focus Q is increased.

11 Claims, 17 Drawing Sheets

FIG. 10B
FIG. 10A
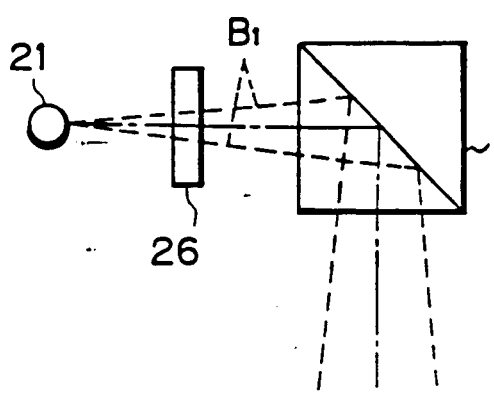
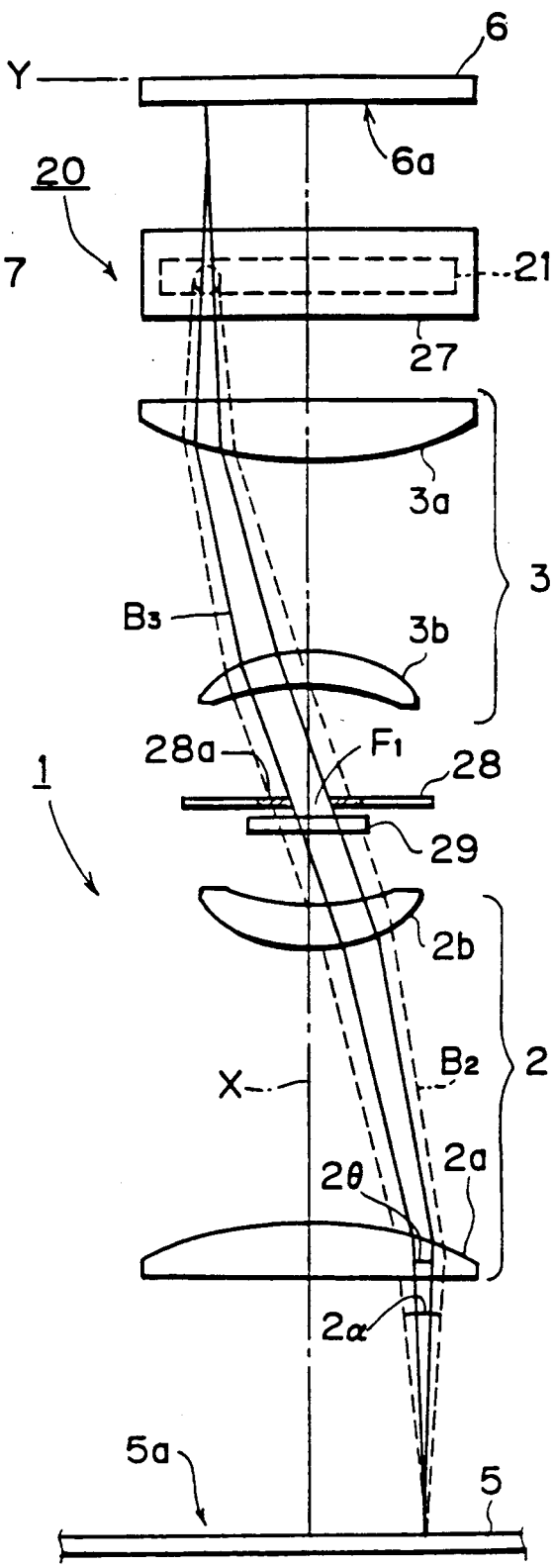

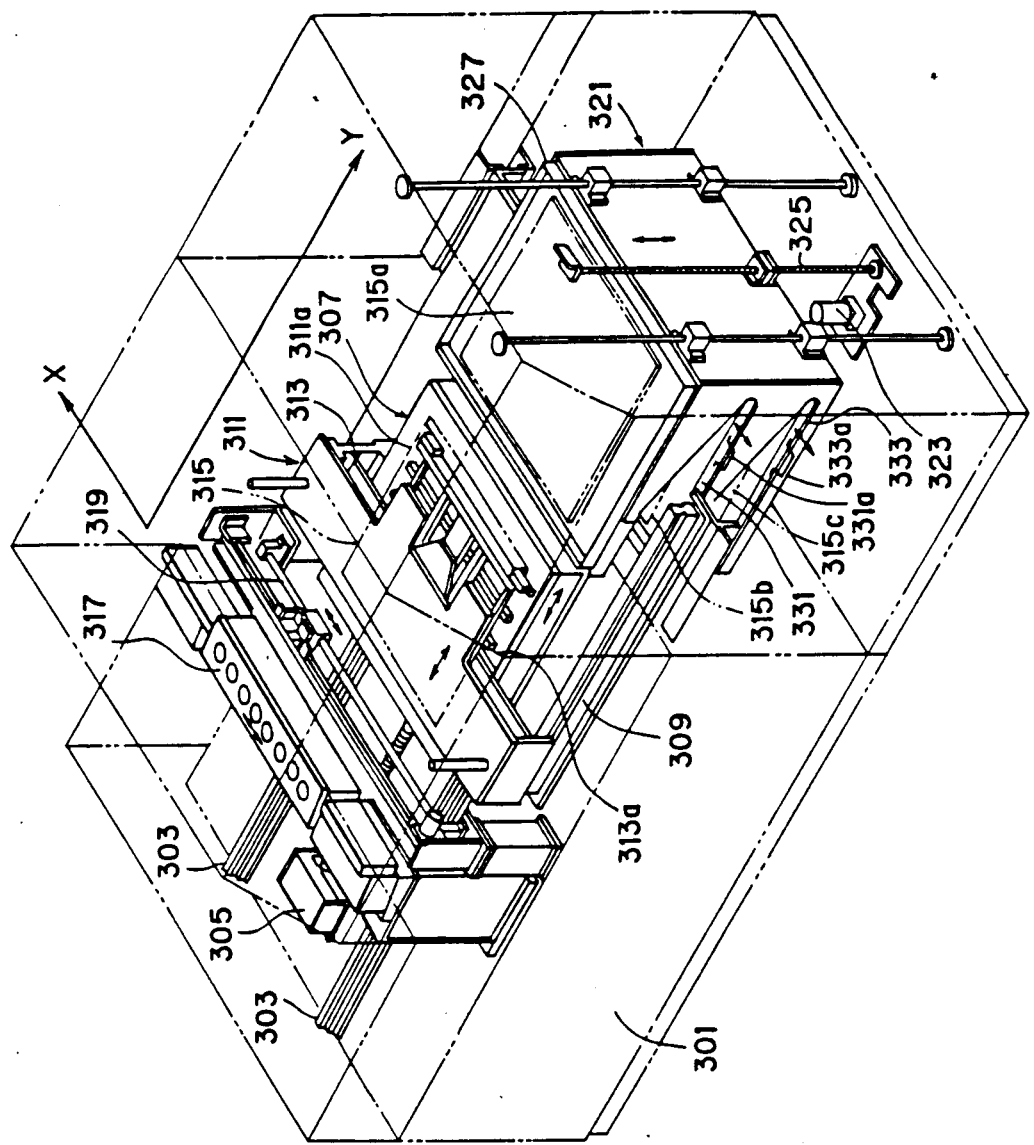

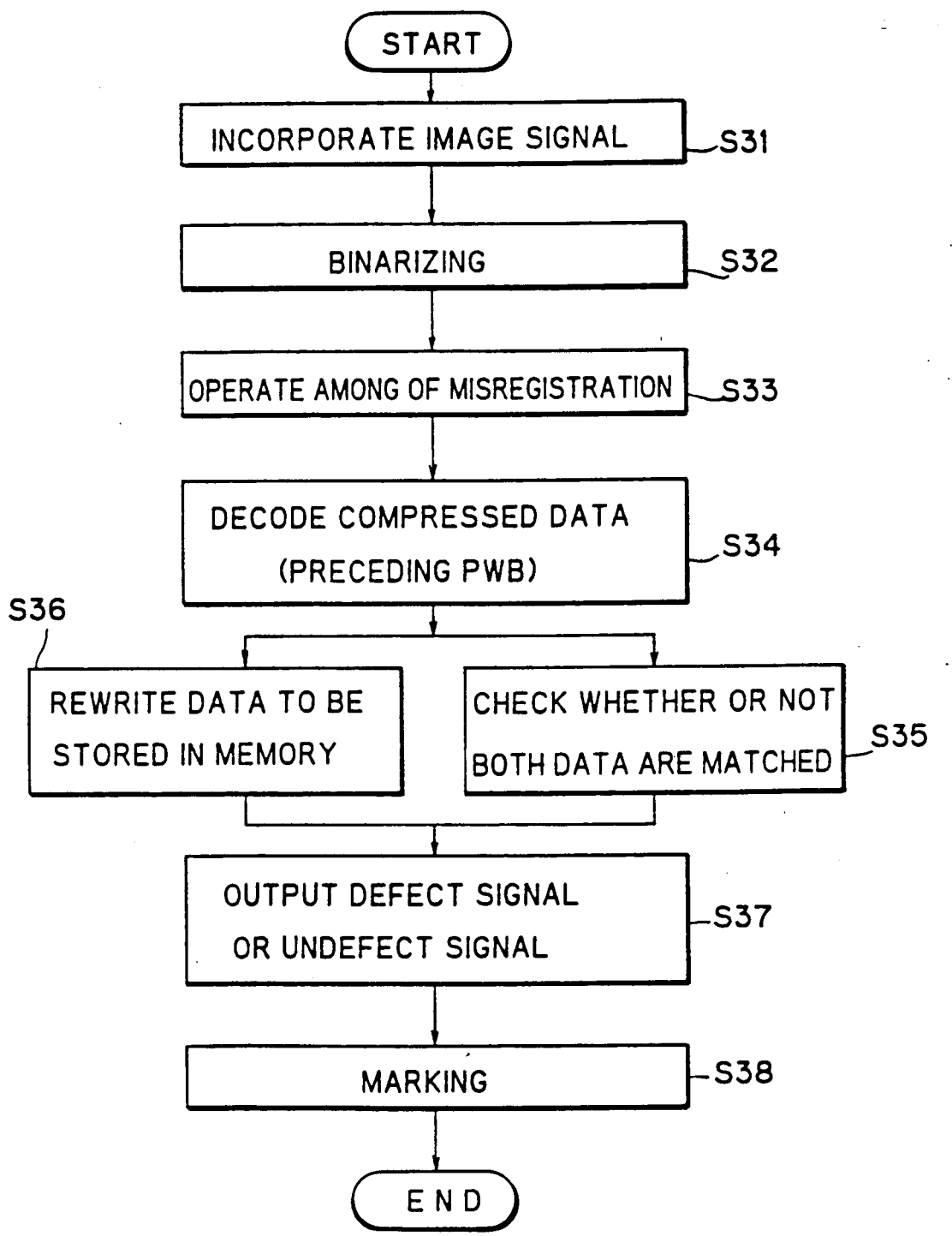

REFLECTION TYPE OPTICAL APPARATUS

BACKGROUND OF THE INVENTION

1. Field of the Invention

The present invention relates to a reflection type optical apparatus for directing light to an illuminated plane through an objective lens located on the optical axis of an image formation lens and for forming an image of the illuminated plane on an image formation plane. The image is formed by reflecting light from the illuminated plane through the objective lens and the image formation lens.

2. Description of the Prior Art

The illuminated plane of such an apparatus must be illuminated as brightly as possible. To this end, a light source having high luminance is required. Further, the illuminated plane must be illuminated as uniformly as possible. Further, the illuminated plane must be illuminated at an appropriate illumination angle (angular aperture).

To satisfy these requirements, a so-called Koehler illumination method, illustrated in FIG. 1, is generally employed. Referring to FIG. 1, numeral 101 denotes an image formation optical system. Numeral 110 denotes an illumination system.

The image formation optical system 101 includes an objective lens 102, an objective lens stop 118, and an image formation lens 103. The objective lens 102, the objective lens stop 118, and the image formation lens 103 are located on an image formation optical axis X. The illumination system 110 illuminates an illuminated plane 105a of an object 105 to be inspected. That is, a beam reflected by the illuminated plane 105a forms an image on an image formation plane 106a through the objective lens 102, the objective lens stop 118, and the image formation lens 103. The objective lens stop 118 is located at a rear focal point $F_1$ of the objective lens 102 to regulate the diameter of the beam reflected by the plane 105a. Thus, the objective lens stop 118 defines the angular aperture $2\theta$ of the objective lens 102.

The illumination system 110 includes a light source 111, a condenser lens 112, an aperture stop 113, a field stop 114, a relay lens 115, and a beam splitter 117. The beam splitter 117 is located between the objective lens stop 118 and the image formation lens 103. The aperture stop 113 is conjugate to the objective lens stop 118 through the relay lens 115. The field stop 114 is conjugate to the illuminated plane 105a through the relay lens 115 and the objective lens 102. An illuminating beam $B_1$ from the light source 111 passes through the condenser lens 112, the aperture stop 113, the field stop 114, and the relay lens 115, and is directed toward the objective lens 102 along the image formation optical axis X by the beam splitter 117. A tertiary image of the light source 111 is formed at an imaginary plane at the point $F_1$ of the objective lens stop 118 by the condenser lens 112 and the relay lens 115. Therefore, the tertiary image of the light source 111 as viewed from the illuminated plane 105a is located at infinity. Thus, there is no irregularity in the illuminating beam $B_1$ applied to the illuminated plane 105a and the plane 105a is uniformly illuminated by the beam $B_1$.

Since the aperture stop 113 and the objective lens stop 118 are conjugate to each other, the size of the tertiary image formed at the point $F_1$ can be controlled by the aperture stop 113. When the aperture stop 113 is contracted, the angular aperture of the illuminating beam $B_1$ applied to the illuminated plane 105a is reduced. When the aperture stop 113 is opened, the size of the tertiary image formed at the point $F_1$ is increased. However, since only a beam having a diameter which is less than or equal to the aperture size of the objective lens stop 118 can pass through the objective lens stop 118, the angular aperture of the illuminating beam $B_1$ is no greater than the value ($2\theta$) corresponding to the aperture size of the lens stop 118 even if the size of the tertiary image exceeds the aperture size of the lens stop 118. In other words, the angular aperture of the illuminating beam $B_1$ can be controlled within a range of 0° to $2\theta$ by adjusting the size of the aperture stop 113. Yet it is impossible to set the angular aperture of the illuminating beam $B_1$ at a value exceeding $2\theta$.

The area illuminated by the beam $B_1$ can be controlled by adjusting the size of the field stop 114.

As illustrated in FIG. 2, it is not unusual for the illuminated plane 105a to be partially swollen at an inclination angle $\theta$. So that such a swell does not reduce the luminous energy directed upon the image formation plane 106a, an angular aperture $2\alpha$ of the illuminating beam $B_1$ and the angular aperture $2\theta$ of the objective lens 102 must be adjusted to satisfy the following expression with respect to the inclination angle $\phi$:

$$\theta < \alpha - \theta \qquad (1)$$

When the angular apertures $2\alpha$ and $2\theta$ are adjusted to satisfy the expression (1), the entire region R (corresponding to the angular aperture $2\theta$ of the objective lens 102) is included in the optical path of a beam $B_2$ reflected by the illuminated plane 105a. As a result, the entire reflected beam corresponding to the region R is directed onto the image formation plane 106a.

In the conventional reflection type optical apparatus, however, the angular aperture $2\alpha$ of the illuminating beam $B_1$ cannot exceed the angular aperture $2\theta$ of the objective lens 102, for the reasons described above. Therefore, when the illuminated plane 105a is not flat, it is impossible to adjust the angular apertures $2\alpha$ and $2\theta$ to satisfy the expression (1). As a result, the swell reduces the luminous energy available for forming the image on the plane 106a.

To form an image of the illuminated plane 105a on the plane 106a when the illuminated plane 105a is partially swollen at the inclination angle $\theta$, the angular apertures $2\alpha$ and $2\theta$ must satisfy the following expression with respect to the inclination angle $\phi$:

$$2\phi < \alpha + \theta \qquad (2)$$

When this condition is satisfied, the optical path of a reflected beam $B''_2$ reflected by the illuminated plane 105a partially overlaps the region R so that a reflected beam corresponding to the overlap (not illustrated) forms an image on the image formation plane 106a through the image formation optical system 101. In other words, when the angular aperture $2\alpha$ of the illuminating beam $B_1$ and the angular aperture $2\theta$ of the objective lens 102 do not satisfy the expression (2) (as illustrated in FIG. 3), the optical path of the beam $B''_2$ reflected by the illuminated plane 105a will not overlap the region R. As a result, the image of the illuminated plane 105a will not be observable by the reflection type optical apparatus.

Thus, a value $(\alpha+\theta)$ must be increased when the illuminated plane 105a is not flat. Since the angular aperture $2\alpha$ of the illuminating beam $B_1$ cannot exceed the angular aperture $2\theta$ of the objective lens 102 (for the reasons stated above), the angular aperture $2\theta$ must be increased to increase the value $(\alpha+\theta)$.

However, depth of focus Q (FIG. 4) is inversely proportional to the square of $\sin\theta$. Thus, $$Q = \pm \frac{\lambda}{2(\sin\theta)^2} \qquad (3)$$

where $\lambda$ is the wavelength of the reflected light.

Therefore, it is desired to reduce the angular aperture $2\theta$ of the objective lens 102 to increase the depth of focus Q, when a non-planar substance is to be observed by the system 101.

However, the objective lens stop 118 must be contracted to reduce the angular aperture $2\theta$ of the objective lens 102, and the angular aperture $2\alpha$ of the illuminating beam $B_1$ is inevitably reduced in response to such contraction of the objective lens stop 118. When the angular aperture 20 is reduced to increase the depth of focus Q, the following problems are caused:

First, illuminance of the illuminated plane 105a is decreased as the angular aperture $2\alpha$ of the illuminating beam $B_1$ is reduced. Second, the expression (2) is not satisfied because of the reduction of the angular aperture $2\theta$ of the objective lens 102 and the angular aperture $2\alpha$ of the illuminating beam $B_1$ when the illuminated plane 105a is not flat. As a result, the image of the illuminated plane 105a is not observable.

When the angular aperture $2\theta$ of the objective lens 102 is increased to satisfy the expression (2) to observe the image of the non-flat illuminated plane 105a, the depth of focus Q is reduced.

SUMMARY OF THE INVENTION

The invention is directed to a method of forming an image of a non-flat first surface on a second surface with good depth of focus. The method includes forming an image of a light source at a rear focal point of an objective lens by transmitting an illuminating light beam from the light source through a condenser lens; polarizing an outer portion of the illuminating light beam by transmitting the illuminating light beam through a polarizing plate located at the rear focal point of the objective lens; illuminating a first surface located at a front focal point of the objective lens by transmitting the illuminating light beam through the objective lens; forming an image of the first surface on a second surface located at a front focal point of an image formation lens by reflecting an image formation light beam from the first surface and transmitting the image formation light beam through the objective lens and the image formation lens; and reducing the diameter of the image formation light beam after the image formation light beam passes through the objective lens. The invention is also directed to an apparatus for performing such a method.

The invention is also directed to an apparatus for forming an image of a first surface on a second surface with good depth of focus, even when the first surface is not flat. The apparatus includes (a) an objective lens for converging illuminating light from a light source onto a first surface and for forming an image of the first surface on a second surface with light reflected from the first surface, the objective lens having an optical axis; (b) a quarterwave plate located on the optical axis between the objective lens and the light source; and (c) a first polarizing plate located on the optical axis between the quarterwave plate and the light source, the polarizing plate including: (1) a non-polarizing region for transmitting the illuminating light and the reflected light; and (2) a polarizing region enclosing the non-polarizing region for transmitting the illuminating light and for obstructing a portion of the reflected light.

The invention is also directed to an apparatus for forming an image of a first surface on a second surface. The apparatus includes (a) an illumination system, including (2) a light source; and (2) a condenser lens and an objective lens for illuminating a first surface with an illuminating light beam from the light source; (b) an image formation system, including (1) an image formation surface for receiving an image formation light beam reflected from the first surface; and (2) an image formation lens and the objective lens for transmitting the image formation light beam to form an image of the first surface on the image formation surface; (c) transmitting means for transmitting the illuminating light beam from the condenser lens to the objective lens and for transmitting the image formation light beam from the objective lens to the image formation lens; and (d) a first polarizing plate and means for modifying the polarization of the beams so that a portion of the image formation light beam is obstructed by the polarizing plate.

The invention is also directed to an optical system which includes: first transmitting means for transmitting a first light beam in a first direction such that the first light beam has a first effective width at a first location; and second transmitting means for transmitting a second light beam in a second direction such that the second light beam has a second effective width at the first location, the second direction being substantially opposite to the first direction, the second effective width being smaller than the first effective width.

The illuminating light passes through the polarizing region and the non-polarizing region, to be applied to the illuminated plane through the quarterwave plate and the objective lens. Reflected light reflected by the illuminated plane is applied to the first polarizing plate through the objective lens and the quarterwave plate, and further passes through only the non-polarizing region. Therefore, the angular aperture of the objective lens is reduced and the depth of focus is increased. Further, since the angular aperture of the illuminating light exceeds that of the objective lens, the illuminated plane can be readily observed even if the illuminated plane is not flat, while illuminance thereof can be sufficiently ensured.

According to a preferred embodiment of the present invention, an equivalent neutral density filter having transmittance substantially identical to that of the polarizing region is further provided in the non-polarizing region.

According to another preferred embodiment of the present invention, an image pickup element is provided on the image formation plane, while the quarterwave plate is rotated by an extremely small angle about an axis which is parallel to the longitudinal axis of the image pickup element.

Accordingly, a principal object of the present invention is to provide a reflection type optical apparatus which can observe an illuminated plane with sufficient depth of focus even if the illuminated plane is not perpendicular to the illuminating light, while ensuring sufficient illuminance of the illuminated plane.

Another object of the present invention is to provide a reflection type optical apparatus which can regularly maintain uniform brightness of an image as formed.

Still another object of the present invention is to provide a reflection type optical apparatus which does not create a ghost on the image pickup element.

BRIEF DESCRIPTION OF THE DRAWINGS

FIGS. 10A and 10B are block diagrams of a second embodiment of a reflection type optical apparatus according to the present invention;

FIG. 11 is a perspective view of a mechanism part of an optical apparatus having the illumination system and the image formation optical system of the second embodiment;

FIG. 17 is a flow chart illustrating an inspection procedure; and

DETAILED DESCRIPTION OF THE PREFERRED EMBODIMENTS

Figure 5:
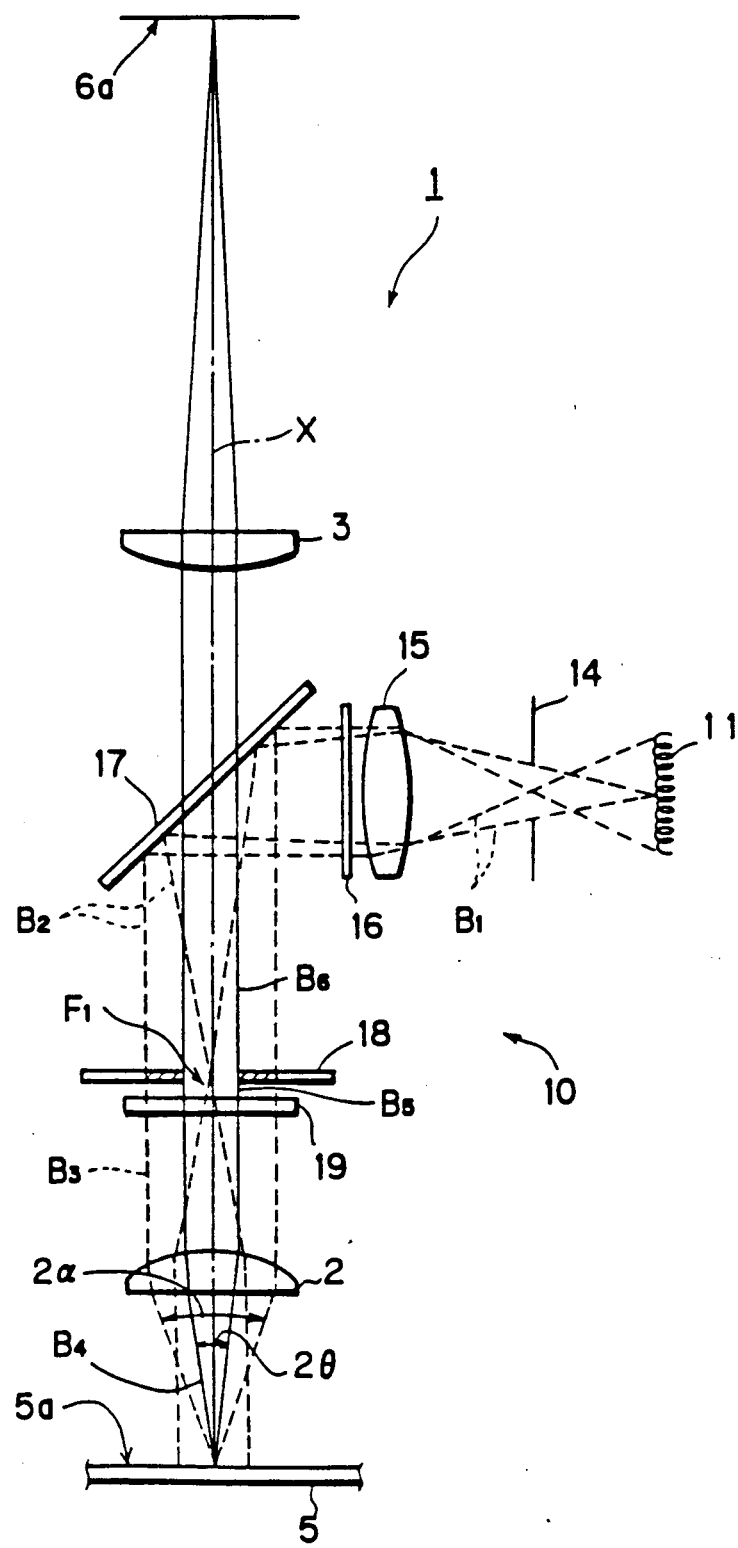
FIG. 5 is a block diagram of a first embodiment of a reflection type optical apparatus according to the present invention.

Referring to FIG. 5, numeral 1 denotes an image formation optical system and numeral 10 denotes an illumination system.

The image formation optical system 1 includes an objective lens 2 and an image formation lens 3 located at prescribed positions on an image formation optical axis X. The illumination system 10 is adapted to illuminate an illuminated plane 5a (of an object 5 to be inspected) located at a front focal point of the objective lens 2. A beam reflected by the illuminated plane 5a passes through the objective lens 2 and the image formation lens 3 and forms an image on an image formation plane 6a (located at a front focal point of the image formation lens 3). The image formation optical system 1 is a telecentric optical system.

The illumination system 10 includes a light source 11, a field stop 14, a condenser lens 15, a first polarizing plate 16, a beam splitter 17 (located between the objective lens 2 and the image formation lens 3), a second polarizing plate 18 at the rear focal point $F_1$ of the objective lens 2, a quarterwave plate 19 located between the objective lens 2 and the second polarizing plate 18 and the objective len 2. The first polarizing plate 16 is adapted to transmit only polarized light (hereinafter referred to as "first linearly polarized light") whose plane of polarization is perpendicular to the plane of the drawings.

Figure 6:
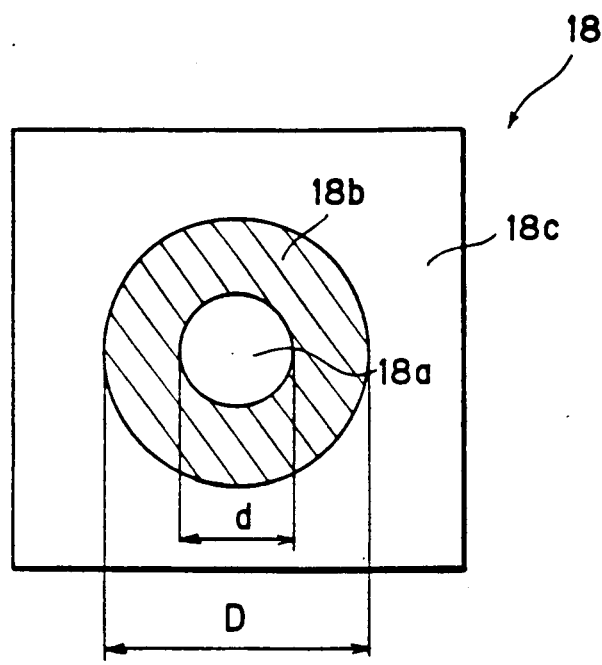
FIG. 6 is a plan view showing a second polarizing plate.

Referring to FIG. 6, the second polarizing plate 18 has a transparent circular non-polarizing region 18a, a polarizing region 18b enclosing the non-polarizing region 18a for transmitting only the first linearly polarized light and an opaque blocking region 18c.

Figure 7A:
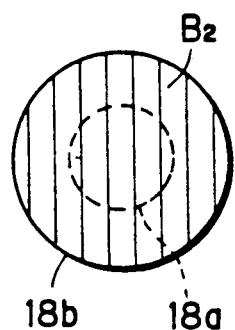
FIG. 7A, 8A and 9A illustrate the relationship between illuminating beams and the second polarizing plate.

An illuminating beam $B_1$ projected from the light source 11 is applied to the first polarizing plate 16 through the field stop 14 and the condenser lens 15. The first polarizing plate 16 transmits an illuminating beam $B_2$ which consists only of the first linearly polarized light. The beam $B_2$ is guided by the beam splitter 17 toward the objective lens 2 along the axis X. The illuminating beam (first linearly polarized light) $B_2$ passes through the non-polarizing region 18a and the polarizing region 18b as illustrated in FIG. 7A and is converted into an illuminating beam $B_3$ of circularly polarized light by the quarterwave plate 19. The illuminating beam (circularly polarized light) $B_3$ is applied to the plane 5a through the objective lens 2.

Figure 7B:
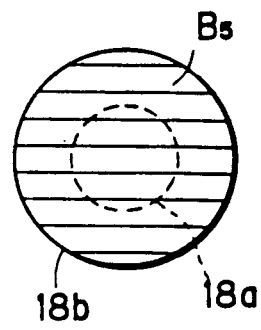
FIGS. 7B, 8B, 9B and 9C illustrate the relationship between reflected beams and the second polarizing plate.

When the illuminating beam (circularly polarized light) $B_3$ is reflected by the illuminated plane 5a, the reflected beam (circularly polarized light) $B_4$ is reversed with respect to the illuminating beam (circularly polarized light) $B_3$. The reflected beam (circularly polarized light) $B_4$ passes through the objective lens 2 and is converted by the quarterwave plate 19 into a reflected beam $B_5$ of linearly polarized light (hereinafter referred to as "second linearly polarized light") whose plane of polarization is parallel to the plane of the drawings (FIG. 7B). The reflected beam (second linearly polarized light) $B_5$ is applied to the second polarizing plate 18. The second linearly polarized light is transmitted through the non-polarizing region 18a but not through the polarizing region 18b. As a result, the diameter of a reflected beam (second linearly polarized light $B_6$ applied to the beam splitter 17 corresponds to the diameter of the non-polarizing region 18a. The reflected beam (second linearly polarized light $B_6$ is converged by the image formation lens 3 and forms an image on the image formation plane 6a.

Figure 1:
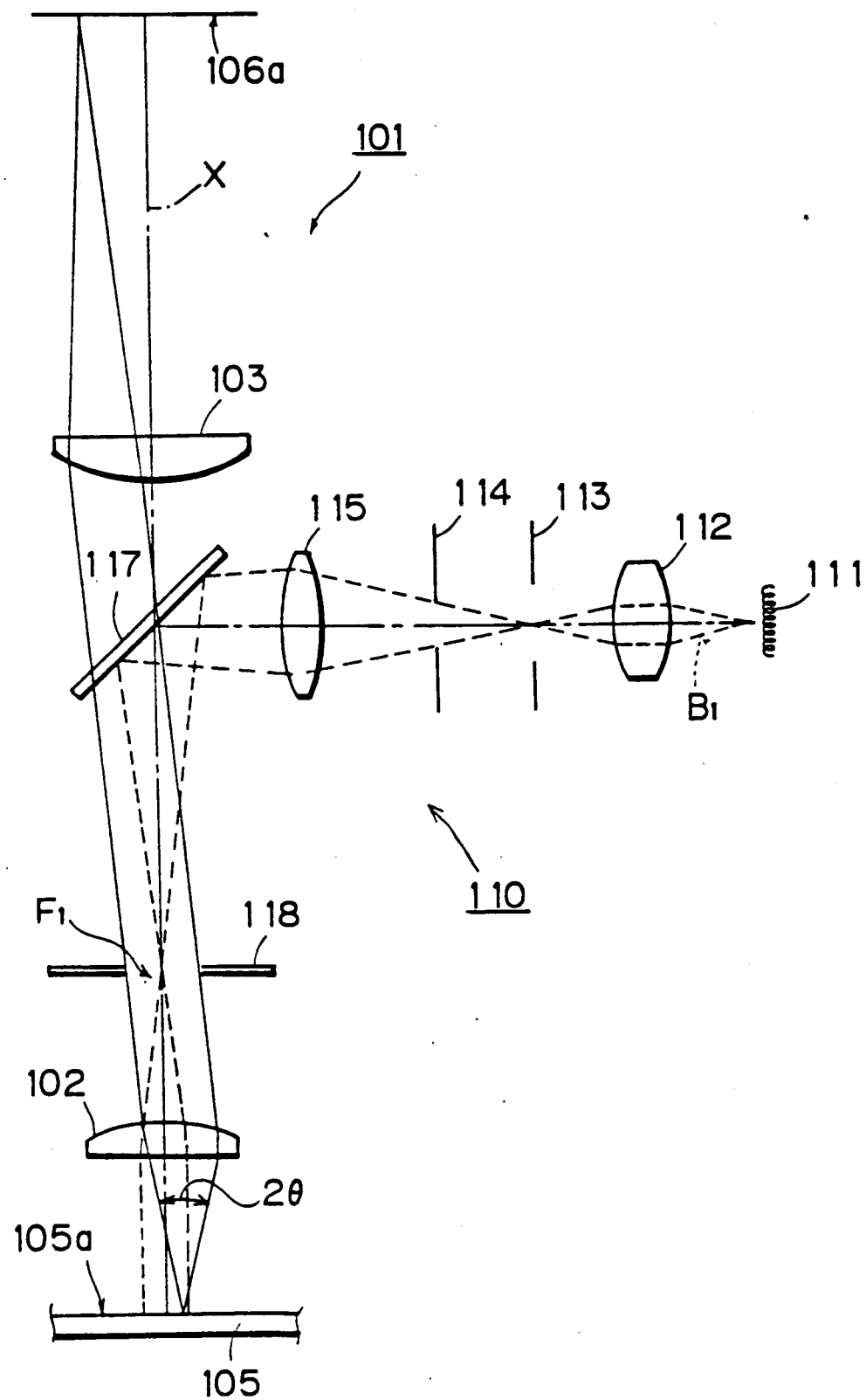
FIG. 1 illustrates a conventional reflection type optical apparatus.
Figure 2:
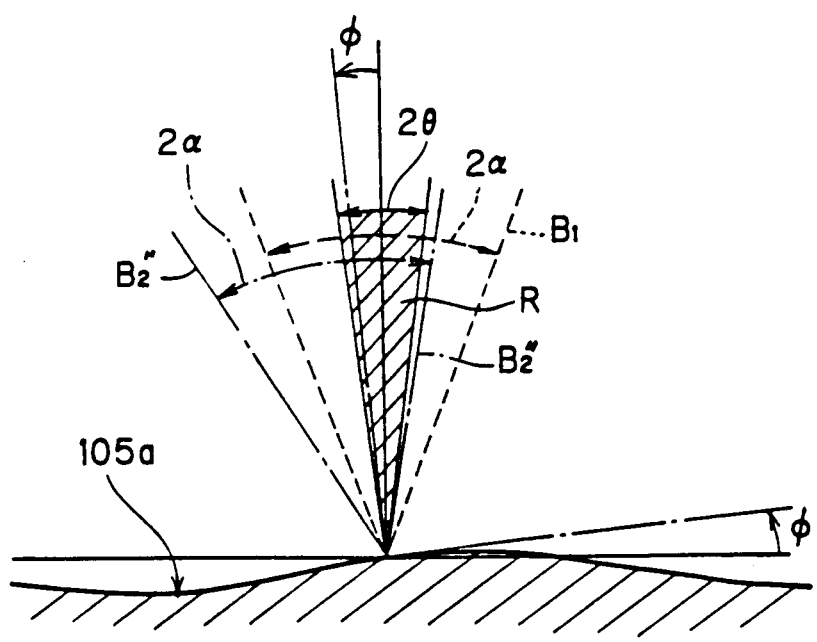
FIGS. 2 and 3 illustrate the relationship between an inclination angle of an illuminated plane and a reflected beam, respectively.
Figure 4:
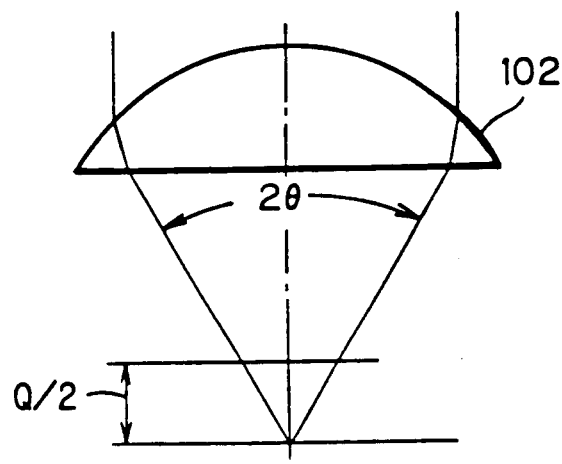
FIG. 4 illustrates the relationship between depth of focus and an angular aperture of an objective lens.
Figure 3:
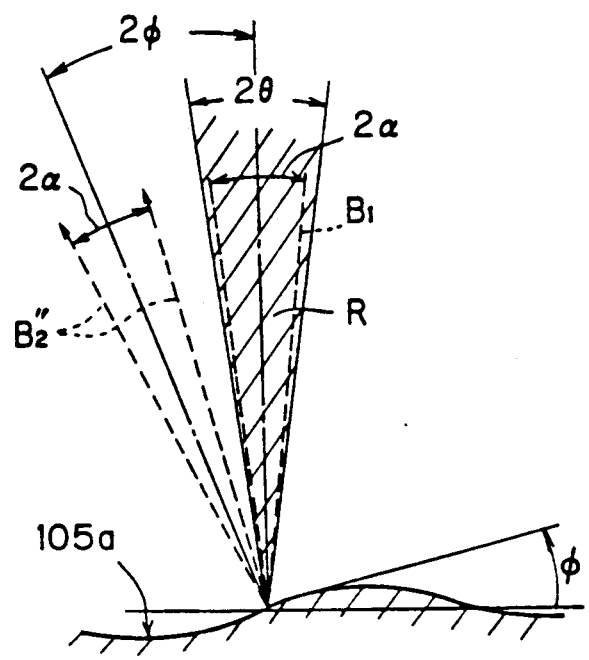

As described above, the illuminated plane 5a is illuminated by the Koehler illumination method, as in the prior art (FIG. 1). Therefore, no irregularity is caused in the illuminating beam $B_3$ applied to the illuminated plane 5a and the plane 5a is uniformly illuminated.

As seen from FIGS. 5 and 6, the angular aperture $2\alpha$ of the illuminating beam $B_3$ corresponds to the diameter D (FIG. 6) of the polarizing region 18b. The angular aperture $2\alpha$ is increased when the diameter D is increased. The angular aperture $2\alpha$ is reduced when the diameter D is reduced. On the other hand, the angular aperture $2\theta$ of the objective lens 2 corresponds to the diameter d (FIG. 6) of the non-polarizing region 18a. The angular aperture $2\theta$ is increased when the diameter d is increased and reduced when the diameter d is reduced. Thus, the angular apertures $2\alpha$ and $2\theta$ are increased and decreased according to different, independent parameters (diameters D and d).

Therefore, when the diameter D is larger than the diameter d and the angular aperture $2\alpha$ is larger than the angular aperture $2\theta$ (as illustrated in FIGS. 5 and 6), the expression (1) may be satisfied. In this case, the illuminated plane 5a can be readily observed even if the same is not flat. At the same time, sufficient illuminance of the plane 5a can be ensured. Furthermore, when the diameter d is small and the angular aperture $2\theta$ is small, the depth of focus Q is increased as understood from the expression (3).

Preferably, the non-polarizing region 18a has an equivalent neutral density filter (an "ND filter") having a transmittance of about 80% to match the transmittance of the polarizing region 18b of the second polarizing plate 18 which transmits only about 80% of the first linearly polarized light in practice.

Figure 8A:
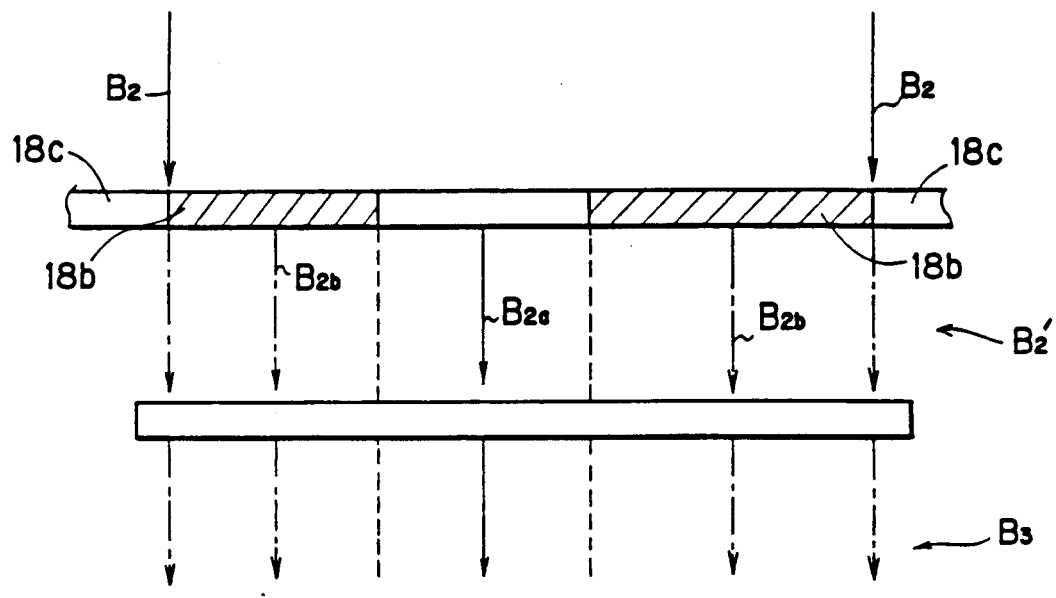

In the embodiment of FIG. 5, it may be assumed that the intensity of the illuminating beam (first linearly polarized light) $B_2$ is uniform (as illustrated in FIG. 8A). However, when the illuminating beam (first linearly polarized light) $B_2$ is applied to the second polarizing plate 18, the intensity of the light $B_{2a}$ (transmitted through the non-polarizing region 18a) is identical to the intensity of the illuminating beam $B_2$, and light $B_{2b}$ (transmitted through the polarizing region 18b) has an intensity of about 80% of that of the illuminating $B_2$. Hence, an illuminating beam $B_2'$ (formed by the light $B_{2a}$ and $B_{2b}$) has a non-uniform intensity.

Figure 8B:
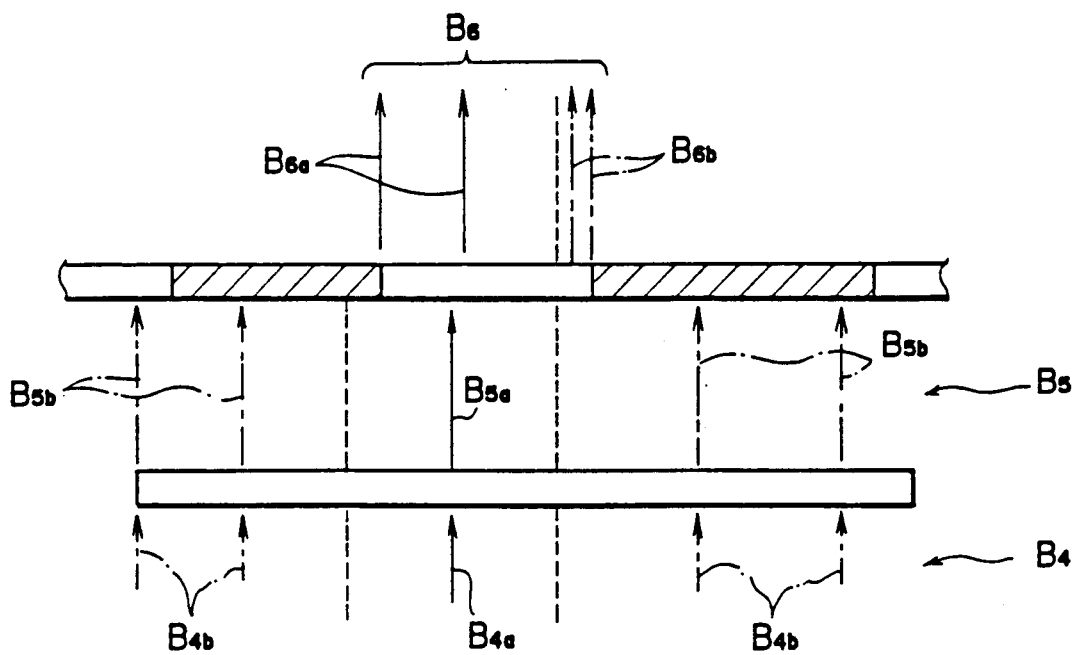

When the illuminated plane 5a is inclined, the beam $B_4$ reflected by the plane 5a is formed by light $B_{4a}$ and light $B_{4b}$, which have different intensities (FIG. 8B). The optical paths of the reflected beams $B_4$ and $B_5$ deviate from the optical path of the illuminating beam $B_3$ by values corresponding to the inclination of the illuminated plane 5a. Therefore, part of the light $B_{5b}$ passes through the non-polarizing region 18a and the reflected beam $B_6$ transmitted through the second polarizing plate 18 includes light $B_{6a}$ and light $B_{6b}$, which have different intensities. When the illuminated plane 5a is not inclined, there is no deviation between the optical paths of the reflected beams $B_4$ and $B_5$, and the illuminating beam $B_3$ and the reflected beam $B_6$ consist of only the light $B_{6a}$.

Therefore, the brightness of the image formed on the plane 6a is a function of the inclination of the illuminated plane 5a. This causes inconvenience, such as a need to change the signal-to-noise ratio of an image pickup element, or the like, for observing the image.

When the non-polarizing region 18a includes an equivalent neutral density filter as hereinabove described, the intensity of the light $B_{2a}$ is about 80% of the intensity of the illuminating beam $B_2$. Thus, the illuminating beam transmitted through the second polarizing plate 18, i.e., the light $B_{2a}$ and the light $B_{2b}$, has a uniform intensity.

The non-polarizing region 18a and the polarizing region 18b need not be circular. Further, the non-polarizing region 18a may be formed simply by a hole in the center of the second polarizing plate 18, or by a transparent glass plate.

Figure 9A:
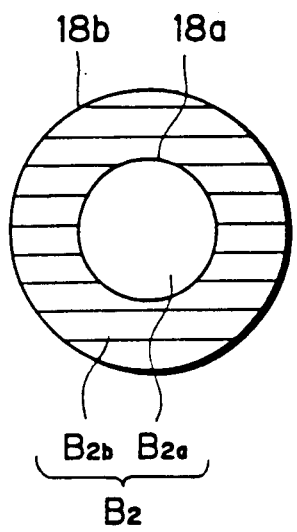

Further, the polarizing plate 16 may be omitted. In this case, an illuminating beam (non-polarized light) $B_1$ projected from the light source 11 is applied to the beam splitter 17 through the field stop 14 and the condenser lens 15 and is guided by the beam splitter 17 toward the objective lens 2 along the image formation optical axis X. The illuminating beam (non-polarized light $B_1$ passes through the non-polarizing region 18a and the polarizing region 18b forming an illuminating beam $B_2$ which includes non-polarized light $B_{2a}$ (corresponding to the non-polarizing region 18a) and first linearly polarized light $B_{2b}$ (corresponding to the polarizing region 18b) (FIG. 9A). The first linearly polarized light $B_{2b}$ is converted into circularly polarized light $B_{3b}$, by the quarterwave plate 19, and thereafter an illuminating beam $B_3$ is applied to the illuminated plane 5a through the objective lens 2. A beam $B_4$ reflected by the illuminated plane 5a is transmitted through the objective lens 2 and the quarterwave plate 19 and is converted into a reflected beam $B_5$. The beam $B_5$ includes non-polarized light $B_{5a}$ corresponding to the non-polarizing region 18a and the second linearly polarized beam $B_{5b}$ corresponding to the polarizing region 18b. The reflected beam $B_5$ is applied to the second polarizing plate 18. Light $B_6$ transmitted through the second polarizing plate 18 consists only of non-polarized light $B_{6a}$ transmitted through the non-polarizing region 18a. Only this non-polarized light $B_{6a}$ is converged on the image formation plane 6a through the beam splitter 17 and the image formation lens 3.

Figure 9B:
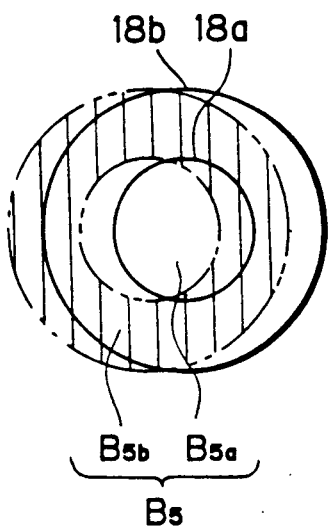
Figure 9C:
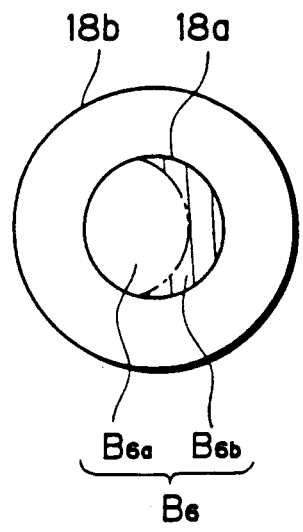

When the illuminated plane 5a is inclined, the positional relationship between the reflected beam $B_5$ and the second polarizing plate 18 is as illustrated in FIG. 9B. Therefore, the reflected beam $B_6$ transmitted through the second polarizing plate 18 includes not only the non-polarized light $B_{6a}$ transmitted through the non-polarizing region 18a but part of the second linearly polarized light $B_{6b}$ (FIG. 9C). In this case, no particular problem is caused in the observation of the illuminated plane 5a. Nevertheless, an equivalent neutral density filter is preferably provided in the non-polarizing region 18a of the second polarizing plate 18 (for the reason set forth above).

Referring to FIG. 10A, numeral 1 denotes an image formation optical system and numeral 20 denotes an illumination system.

The image formation optical system 1 includes an objective lens 2 (formed of lenses 2a and 2b located on an image formation optical axis X), an image formation lens 3 (formed of lenses 3a and 3b on the axis X), and a line sensor 6 at an image formation plane 6a. The line sensor 6 contains a one-dimensional array of CCD image sensing elements to obtain an image. The illumination system 20 illuminates an illuminated plane 5a of an object 5 to be inspected. A beam reflected by the illuminated plane 5a forms an image on an image formation plane 6a through the objective lens 2 and the image formation lens 3. A second polarizing plate 28 (described later) is located at the rear focal point $F_1$ of the objective lens 2 to act as a stop for the objective lens 2. As described above, the image formation optical system 1 is a telecentric optical system.

The illumination system 20 includes a linear light source 21, such as a line filament or a fluorescent lamp (FIG. 10B), a first polarizing plate 26 for transmitting only first linearly polarized light, a beam splitter 27 located between the image formation lens 3 and the line sensor 6, the second polarizing plate 28 located at the rear focal point $F_1$ of the objective lens 2, a quarterwave plate 29 located between the objective lens 2 and the second polarizing plate 28 and the objective len 2. As illustrated in FIG. 10A, the illumination system 20 is a critical illumination system and is adapted to form an image of the light source 21 on the plane 5a. The second polarizing plate 28 and the quarterwave plate 29 are identical to the second polarizing plate 18 and the quarterwave plate 19 illustrated in FIG. 5. Other features of the illumination system 20 are also identical to those of the illumination system 10.

Therefore, as in the first embodiment, the angular apertures $2\alpha$ and $2\theta$ are increased and decreased according to different, independent parameters (diameters D and d). Thus, when the diameter D is larger than the diameter d, and the angular aperture $2\alpha$ is larger than the angular aperture $2\theta$, the expression (1) may be satisfied. In this case, the illuminated plane 5a can be readily observed even if the same is not flat. At the same time, sufficient illuminance of the illuminated plane 5a can be ensured. When the diameter d is small, and the angular aperture $2\theta$ is correspondingly small, the depth of focus Q is large, as understood from the expression (3).

In the second embodiment, since the second polarizing plate 28 is located at the rear focal point $F_1$, and since a light beam projected from a portion of the light source 21 may be substantially parallel to the axis X in the vicinity of the second polarizing plate 28, the beam may be reflected by the quarterwave plate 29 and condensed on the image formation plane 6a causing an undesirable ghost to be formed thereon. To prevent this, the quarterwave plate 29 may be rotated by an extremely small angle about an axis which is parallel to the longitudinal axis Y of the line sensor 6.

The first and second polarizing plates 16, 26, 18, and 28 may, alternatively, be adapted to transmit only the second linearly polarized light.

Further, the location of the image formation lens 3 is not restricted provided that the same is closer to the image formation plane 6a than is the objective lens 2. Further, the objective lens 2 and the image formation lens 3 may be replaced by a functionally equivalent lens system located between the quarterwave plate 19 or 29 and the illuminated plane 5a.

Referring to FIGS. 11-14, an optical apparatus compares pattern data corresponding to inspected obJects, such as printed wiring boards (hereinafter referred to as "PWBs"), to inspect for pattern defects. Briefly, this apparatus stores image information relating to a certain PWB and incorporates image information relating to a subsequent PWB to compare the subsequent PWB with the stored information to determine whether the subsequent PWB has a pattern defect. For convenience, the former PWB is referred to hereinafter as the "preceding PWB" and the latter PWB is referred to hereinafter as the "subsequent PWB".

1. STRUCTURE

As illustrated in FIG. 11, the optical apparatus has a frame 301 equipped with an inspection table 307. The table 307 is reciprocated by a table driving part 305 along table driving rails 303 in a Y-axis direction. Vertically movable PWB carrier plates 311 and 313 are reciprocated along a carrier rail 309 in the Y-axis direction while holding a PWB. An image pickup block 317 is reciprocable in an X-axis direction for reading an image of the surface of a PWB 315 carried on the inspection table 307. A marker 319 is adjacent to the image pickup block 317 and is reciprocable in the X-axis direction for marking a defective position of the PWB 315.

A PWB cassette device 321 is adjacent the frame 301, in the Y-axis direction. The PWB cassette device 321 stores an uninspected PWB 315a on its upper surface. The PWB cassette device 321 includes a nondefective cassette 331 for storing a nondefective PWB 315b and a defective cassette 333 for storing a defective PWB 315c. The PWB cassette device 321 is vertically moved by a motor 323 through a driving shaft 325. The cassettes 331 and 333 may be extracted in the X-axis direction for storing the PWBs by means of handles 331a and 333a.

The PWB carrier plate 311 has, at its lower side, a frame-type sucker 311a. The frame-type sucker 311a is connected to a vacuum system (not illustrated) and carries the uninspected PWB 315a toward the inspection table 307. The PWB carrier plate 311 is hereinafter referred to as a "PWB supply carrier plate 311". On the other hand, the PWB carrier plate 313 (positioned under the PWB supply carrier plate 311) has, at its lower side, a frame-type sucker 313a. The frame-type sucker 313a is coupled to a vacuum system and carries the PWB 315 on the inspection table 307 toward the PWB cassette device 321, i.e., toward an upper position of the nondefective cassette 331 or the defective cassette 333 which is elevated to and stopped in a prescribed position. The PWB carrier plate 313 is hereinafter referred to as a "PWB discharge carrier plate 313".

Figure 12:
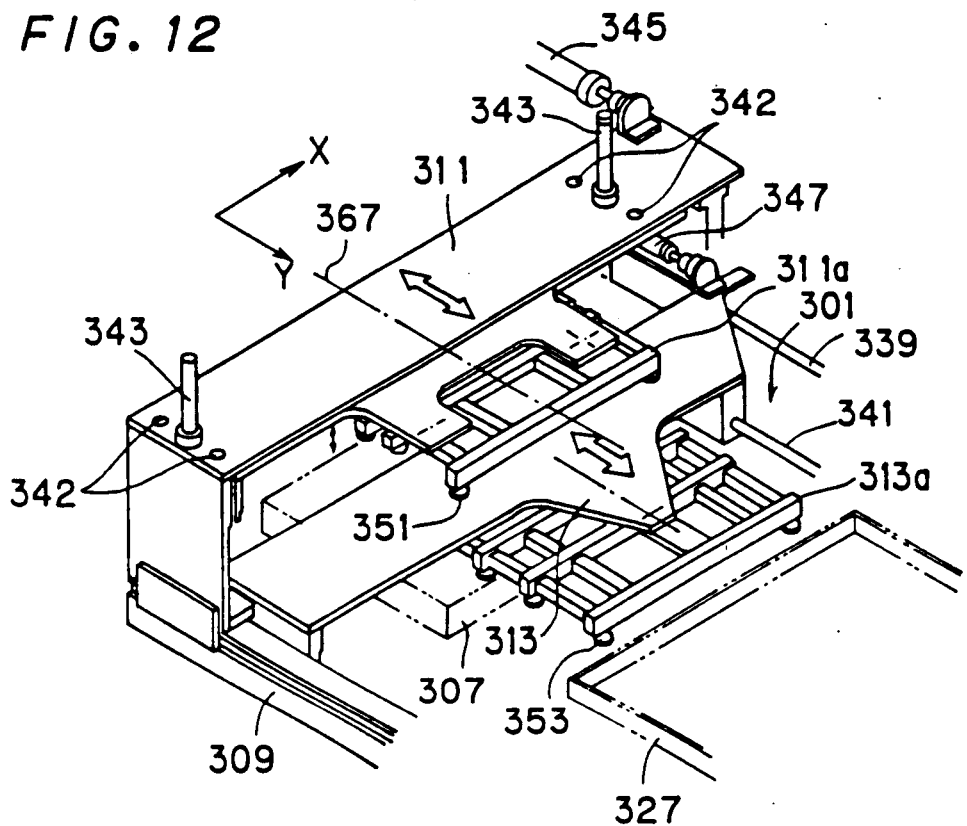
FIGS. 12 and 13 are partially fragmented perspective views of the optical apparatus of FIG. 11.

As illustrated in detail in FIG. 12, first ends of the carrier plates 311 and 313 in the X-axis are guided by the carrier rail 309. Second ends thereof are guided by through guide bars 339 and 341. The guide bars 339 and 341 are fixed to the frame 301. The carrier plate 311 is further guided by two pairs of through guide poles 342. The poles 342 are vertical with respect to the frame 301 and vertically movable by vertical driving means 343. The supply carrier plate 311 is driven in the Y-axis direction by a driving cylinder 345. The cylinder 345 is controlled on the basis of a prescribed control signal. The discharge carrier plate 313 is similarly driven in the Y-axis direction by another driving cylinder 347.

A rubber bell-shaped sucking part 351 is coupled to the frame-type sucker 311a. A similar sucking part 353 is coupled to a lower side of the frame-type sucker 313a.

Figure 13:
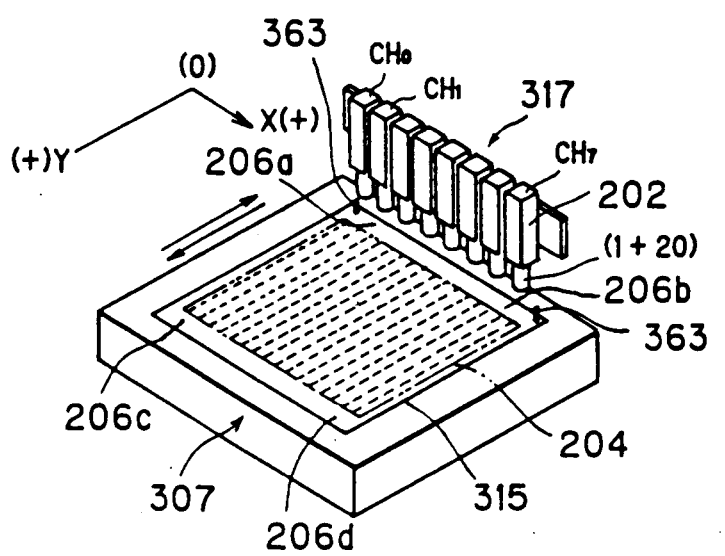

FIG. 13 is a perspective view of the image pickup block 317. One image pickup block 317 includes eight independent CCD cameras 202. Each of the cameras 202 includes the image formation system 1 and the illumination system 20 of FIGS. 10A and 10B. The structure thereof is described in detail above.

The CCD cameras 202 are defined as channels 0 to 7 (hereinafter referred to as $CH_0, CH_1, \ldots, CH_7$, respectively). Each one of the CCD cameras 202 contains one-dimensional CCD image sensors of 2048 bits. Each CCD camera 202 scans a certain image pickup region 204 corresponding to an interconnection pattern of the PWB 315 in the X-axis direction, i.e., in the main scanning direction. The width of the area scanned by each CCD camera 202 is about 32 mm in the X-axis direction. The areas scanned by the CCD cameras 202 overlap each other by about 1 mm.

Figure 14:
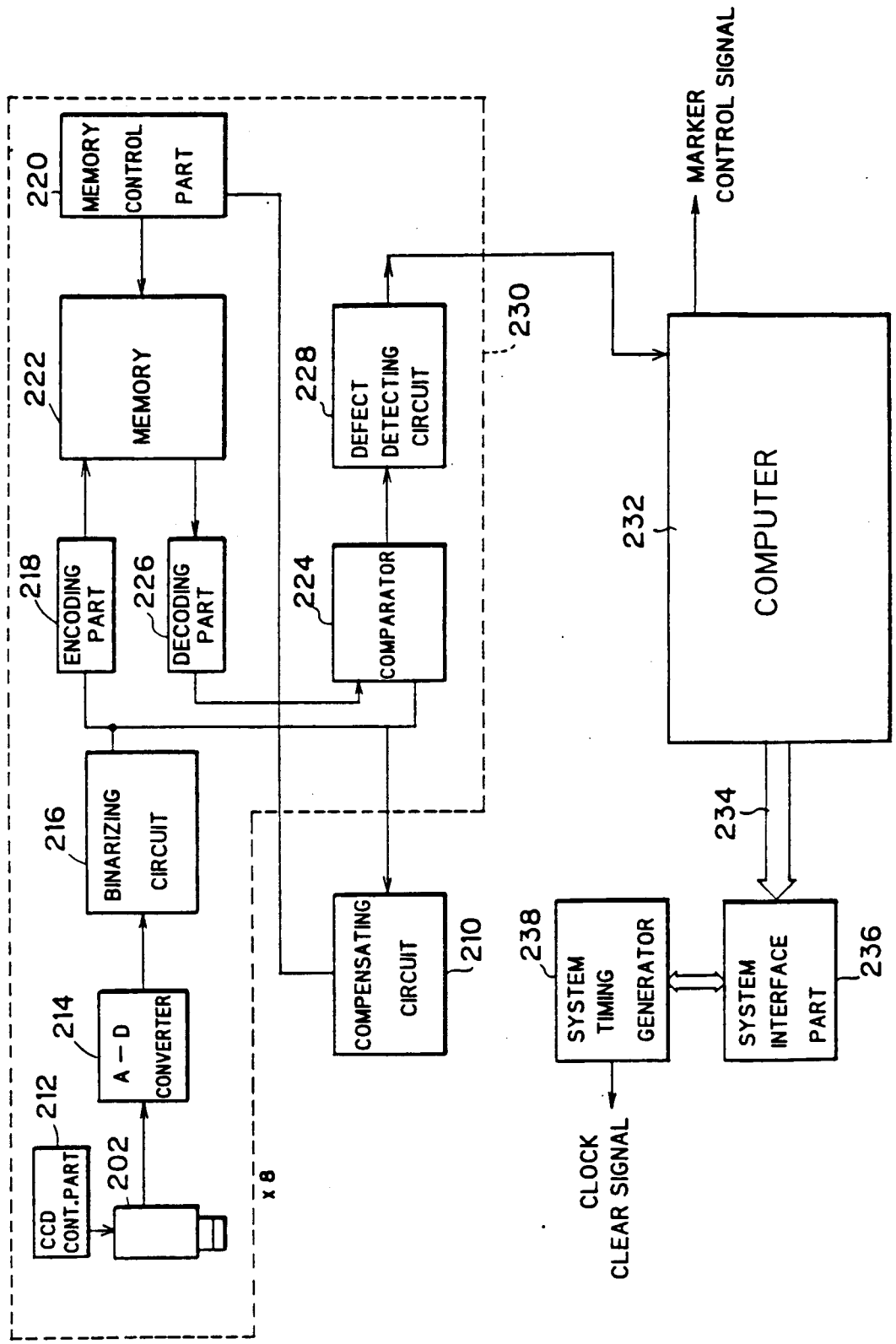
FIG. 14 is a block circuit diagram of a control part of the aforementioned optical apparatus.

Referring to FIG. 14, each CCD camera 202 is controlled by a CCD control part 212 for outputting an analog image signal. This image signal is converted into a 6-bit digital signal by an A-D converter 214 and outputted to a binarizing circuit 216.

The binarizing circuit 216 obtains binary signals "1" and "0", corresponding to brightness of pixels, by a follow-up floating binarizing method of putting a two-dimensional space filter of 5×5 on the digital signal. The binary signals are outputted from the binarizing circuit 216 to an encoding part 218, a comparator 224, and a compensating circuit 210.

The encoding part 218 encodes binary image signals to compressed data by a run-length coding method, to store the same in a memory 222.

On the other hand, the compensating circuit 210 computes the amount of misregistration of the PWB 315 with respect to reference coordinates of the system on the basis of the binary signals (as hereinafter described), to obtain the difference from the amount of misregistration of the preceding PWB. A signal responsive to this difference is outputted (at the appropriate time) to a memory control part 220. The memory control part 220 in turn controls reading of image information relating to the preceding PWB from the memory 222 on the basis of the aforementioned signal.

Compressed data relating to the preceding PWB stored in the memory 222 are decoded in a decoding part 226 and inputted as a pixel signal in one input terminal of the comparator 224. Meanwhile, a binary image signal relating to the subsequent PWB is inputted in another input terminal of the comparator 224, and the comparator 224 checks, pixel-to-pixel, whether the signals are the same or not. The signal "0" is outputted when there is a match within the comparator 224 and the signal "1" is outputted upon a mismatch. The signals are outputted to a defect detecting circuit 228 in a time-series manner.

The defect detecting circuit 228 detects a pattern defect using defect analyzing logic, to output a defect signal to a computer 232.

Each one of the CCD cameras includes the circuit group 230 enclosed by broken lines in FIG. 14. The computer 232, which controls the eight circuit groups 230, includes a memory unit, a system disk unit, a keyboard input unit, an input/output control unit, a CRT monitor, and the like (not illustrated), and controls the entire apparatus through a system interface part 236 which is coupled to a bus 234.

A system timing generator 238 is coupled to the system interface part 236 and supplies required timing signals such as clocks and clear signals to respective circuit blocks of the circuit groups 230.

2. OPERATION

Figure 15:
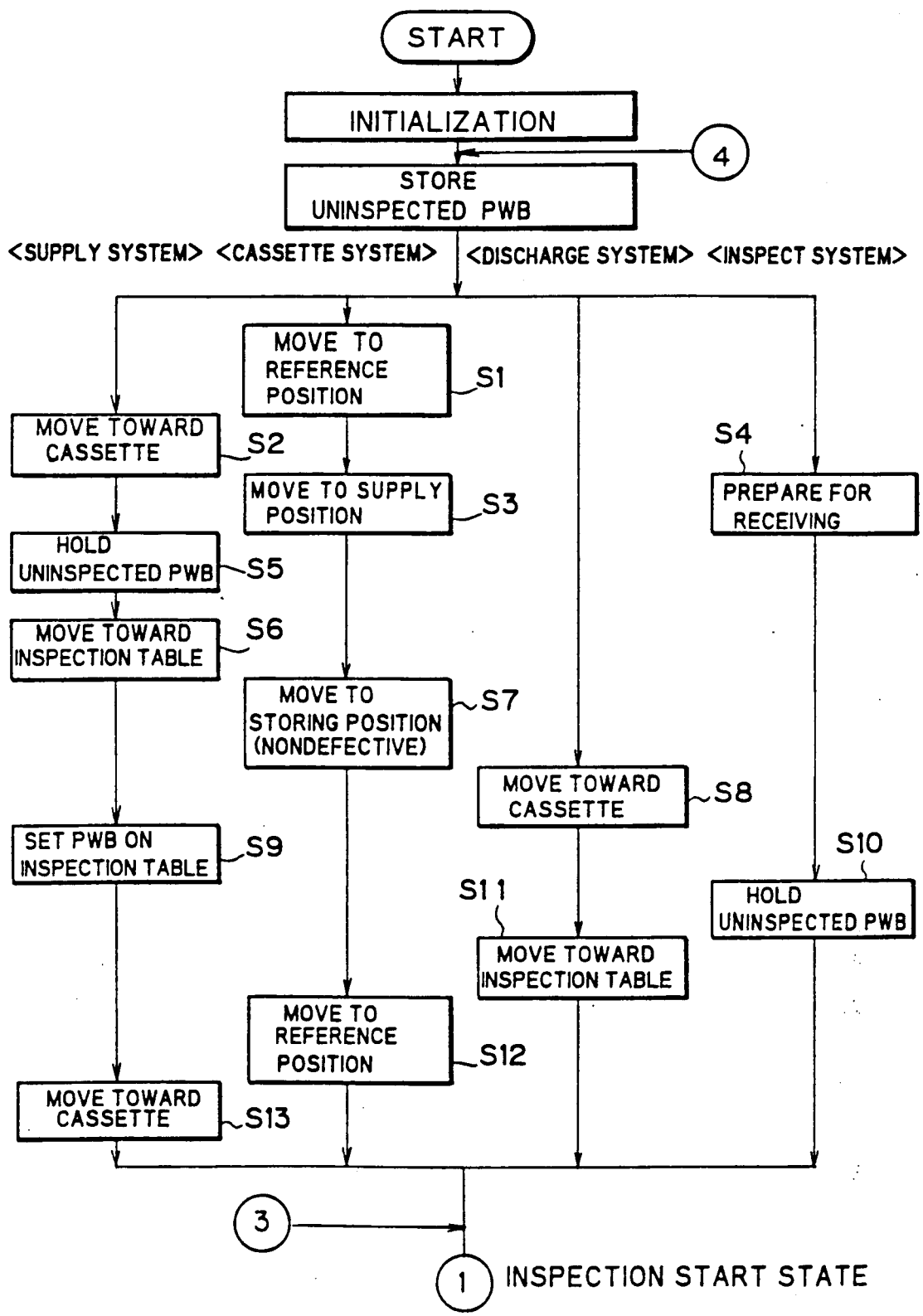
FIG. 15 is a flow chart illustrating the operation of the mechanism part of FIG. 11.
Figure 15:
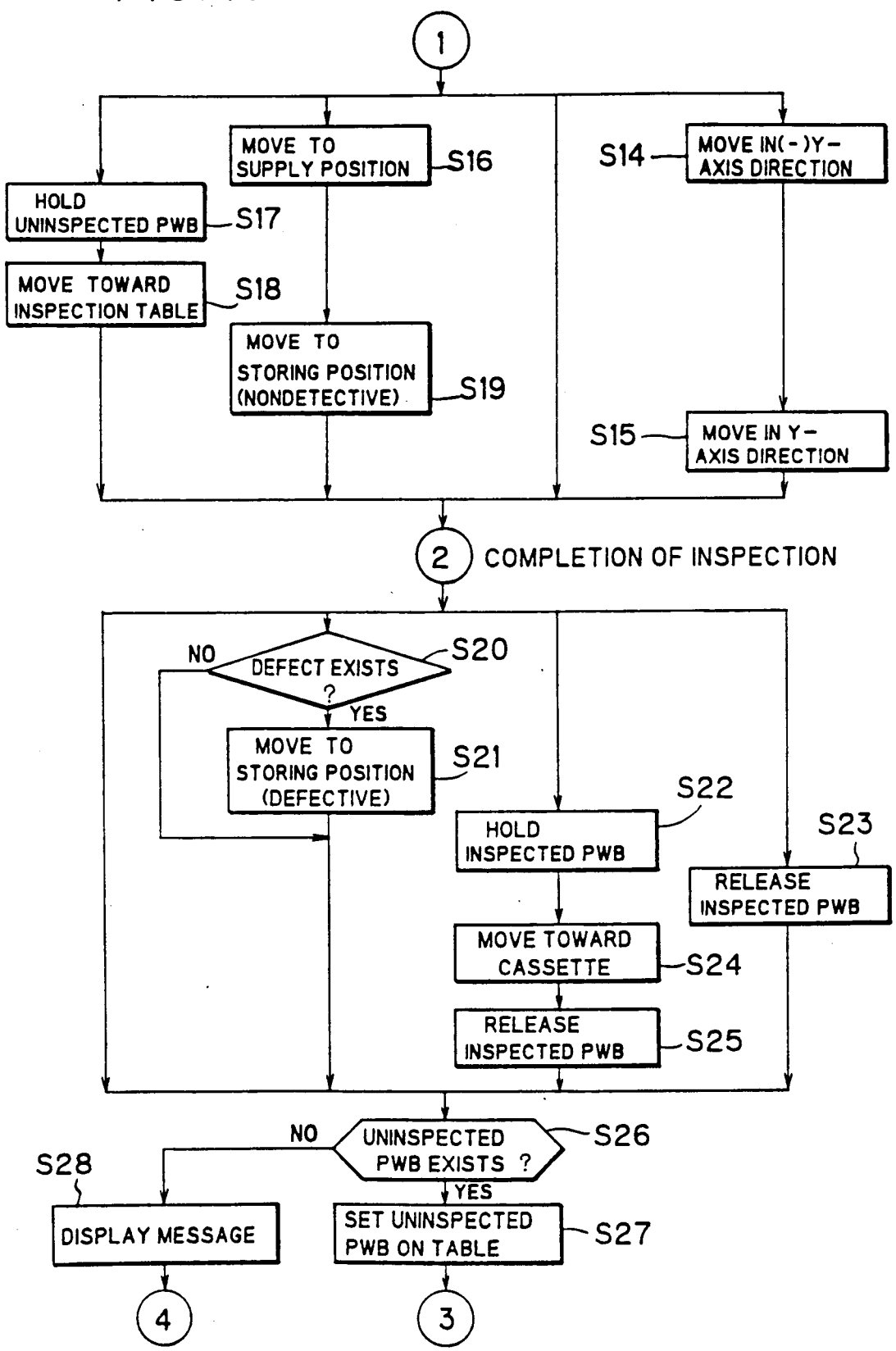
Figure 16A:
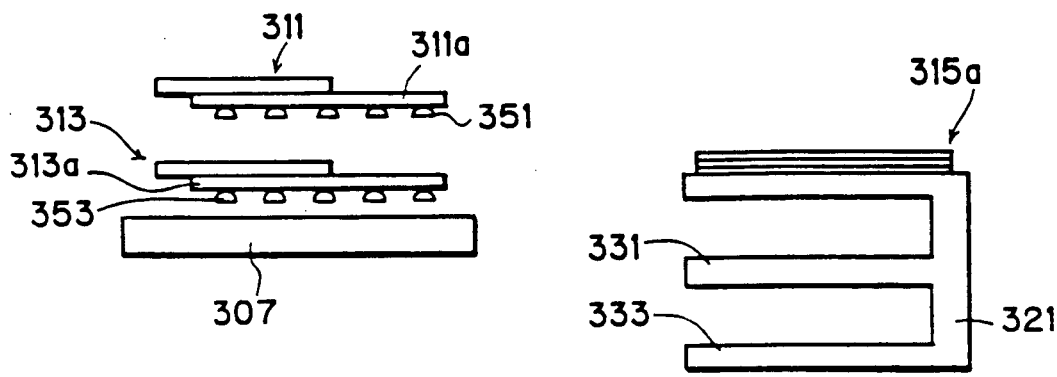
FIGS. 16A to 16F illustrate the operation of the mechanism part.

Referring to FIG. 15, the PWBs are sequentially transferred to a position under the image pickup block 317 as follows: After the apparatus is completely initialized, an operator supplies an inspection start command to the control part through the keyboard input unit, whereby respective parts of the mechanism part are controlled as follows, in response to a command from the control part:

As illustrated in FIG. 16A, the cassette device 321 is moved to a predetermined reference position (step S1). Then, the supply carrier plate 311 is moved toward the cassette device 321 (step S2), and thereafter the cassette device 321 is elevated to a PWB supply position (step S3). At the same time, the inspection table 307 prepares for receiving the PWB (step S4).

Figure 16B:
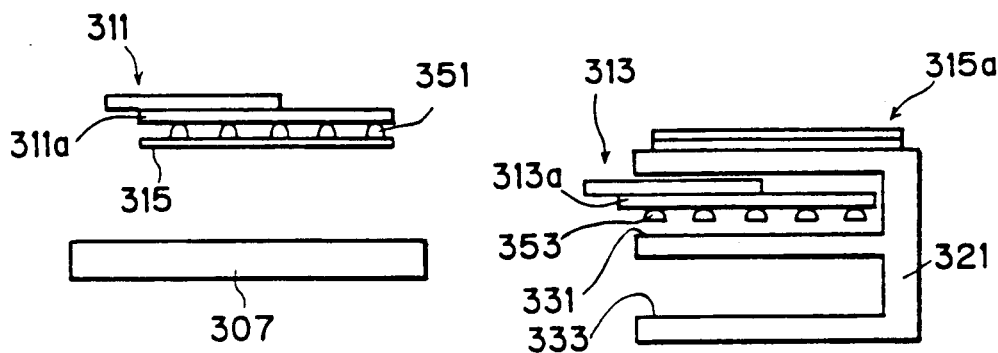

Thereafter, the supply carrier plate 311 holds the uninspected PWB 315a (step S5) and the PWB 315a is moved to a position above the inspection table 307 (step S6). Then the cassette device 321 is moved into position for storing a non-defective PWB (step S7), and the discharge carrier plate 313 is moved toward the cassette device 321 (FIG. 16B) (step S8).

Then, the supply carrier plate 311 is lowered from above the inspection table 307, to set the uninspected PWB 315 on the inspection table 307 (step S9), and the inspection table 307 holds the uninspected PWB 315 (step S10). The uninspected PWB 315 is registered by pins 363 located on the inspection table 307 and held by the inspection table 307 (FIG. 13). Referring to FIG. 13, numerals 206a to 206d denote registration marks. These marks 206a to 206d are in constant positional relation to the interconnection pattern of PWB 315.

Figure 16C:
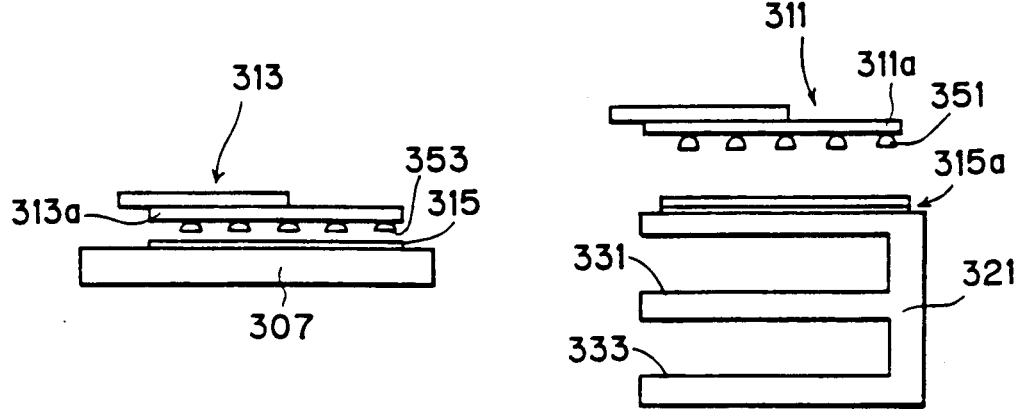

Then, the discharge carrier plate 313 is moved toward the inspection table 307 (step S11), and the cassette device 321 is moved to the reference position (step S12). Thereafter, the supply carrier plate 311 is moved toward the cassette device 321 (step S13). At this point, the optical apparatus enters an inspection start state (FIG. 16C).

Figure 16D:
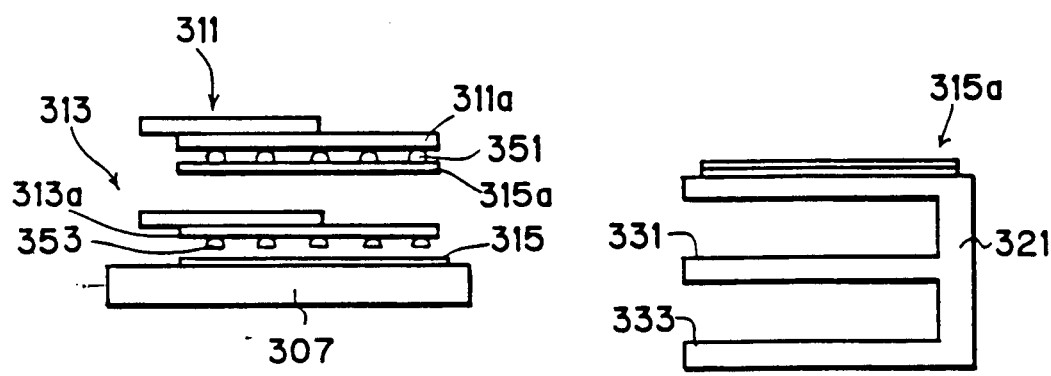

Then, the inspection table 307 moves in a (−) Y-axis direction (step S14), returns (step S15) after a prescribed amount in the (−) Y-axis direction, and is stopped in its original position. The control part incorporates image data of the PWB 315 to perform prescribed processing (described later) on the basis of the image data. On the other hand, the steps S16 to S19 are executed simultaneously with the steps S14 and S15 to reduce the tact time of the system. That is, the cassette 321 is elevated to the PWB supply position step S16) and the supply carrier plate 311 holds the subsequent uninspected PWB 315a (step S17), and is thereafter moved to a position above the inspection table 307. Thus, the subsequent uninspected PWB 315a can be set on the inspection table 307 immediately after the PWB 315 is completely inspected. At the step S19, the cassette 321 is moved into position to store a nondefective PWB (FIG. 16D).

Figure 16E:
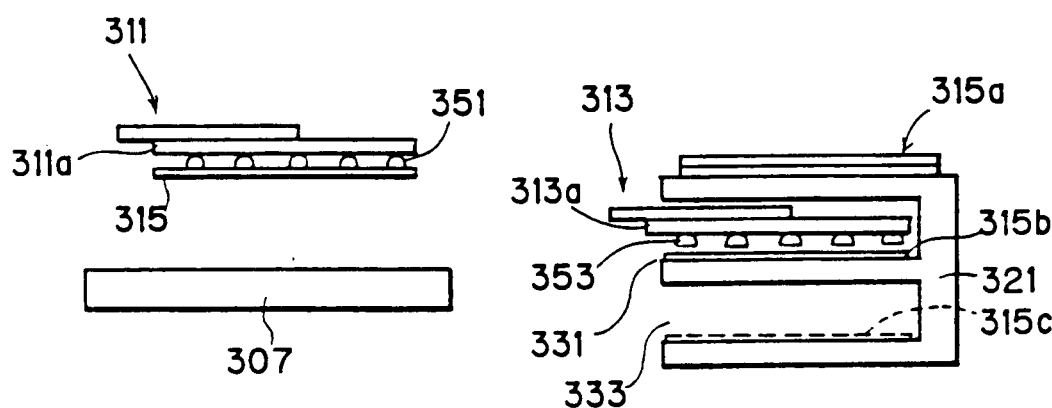

Upon completion of inspection, a determination is made as to whether the inspected PWB 315 is defective (step S20) and, if the PWB 315 is determined to be defective, the cassette device 321 is moved to a position for storing the defective PWB 315 (step S21). Thereafter, the discharge carrier plate 313 holds the PWB 315 (step S22), and then the inspection table 307 releases the PWB 315 (step S32). Then, the discharge carrier plate 313 is moved toward the cassette device 321 (step S24), to release the PWB 315 (step S25). Thus, the PWB 315 is stored either in the nondefective cassette 331 or in the defective cassette 333. That is, when it has no defect, the PWB 315 is stored in the nondefective cassette 331 (solid lines in FIG. 16E). The PWB 315 is stored in the defective cassette 333 when the PWB 315 is defective (dotted lines in FIG. 16E).

Then, a determination is made (step S26) as to whether there is an uninspected PWB, and when it is determined that there is an uninspected PWB, the uninspected PWB is set on the inspection table 307 as in the steps S9 to S13 (step S27), the optical apparatus is set in the inspection start state (FIG. 16C), and inspection is performed.

Figure 16F:
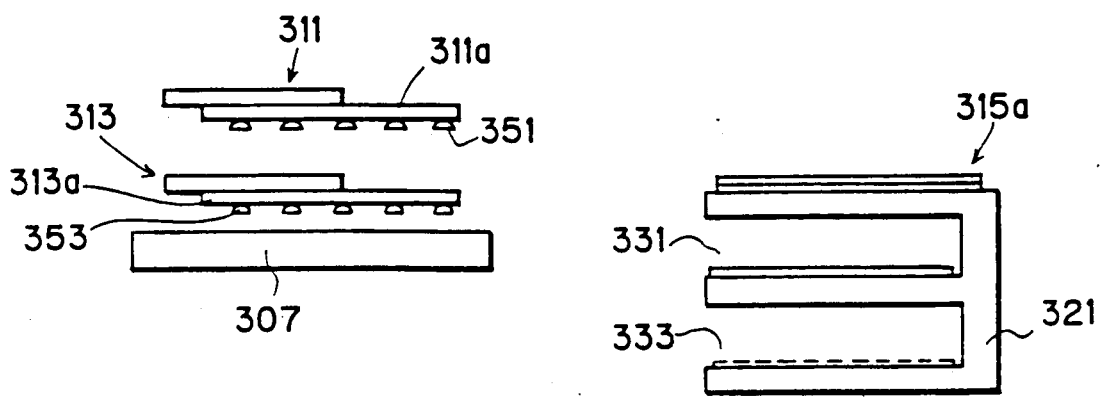

On the other hand, when it is determined that there is no uninspected PWB (step S26), the discharge carrier plate 313 is moved toward the inspection table 307 and the cassette device 321 is moved to an uninspected PWB set position (FIG. 16F). Thereafter, a message for facilitating setting of an uninspected PWB or the like is displayed on the CRT monitor (step S28).

The operator again performs the initialization operation and supplies an inspection start command to the control part, whereby the above-described operation is repeated.

In the following, for convenience of illustration, it is assumed that the memory 222 already stores compressed data relating to the preceding PWB.

When the steps S14 and S15 are executed, the CCD image sensor 202 incorporates an image signal of the PWB 315 in the control part (step S31) (FIG. 17), and the image signal is converted into a 6-bit digital signal by the A-D converter 214. Then, the digital signal is binarized by the binarizing circuit 216 (step S32).

Figure 18:
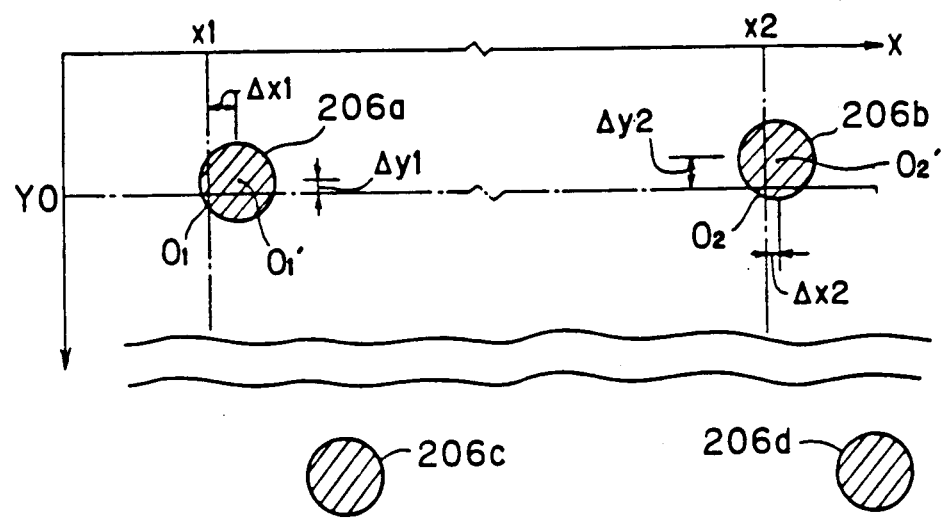
FIG. 18 illustrates a method of computing the amount of misregistration of a printed wiring board with respect to reference coordinates.

Within the binary image signals, those corresponding to the registration marks 206a to 206d are inputted to the compensating circuit 210. The compensating circuit computes the misregistration of the PWB 315 with respect to reference coordinates of the system on the basis of the signals (step S33). In more concrete terms, central positions $O_1'$ and $O_2'$ of the registration marks 206a and 206b are obtained on the basis of the binary image signals which correspond to the registration marks 206a and 206b (FIG. 18), and amounts ($\Delta x_1$ and $\Delta y_1$) and ($\Delta x_2$ and $\Delta y_2$) of misregistration from the predetermined reference coordinates are obtained. The angle between a straight line $O_1'$ - $O_2'$ and line $O_1$ - $O_2$ is obtained from these amounts ($\Delta x_1$ and $\Delta y_1$) and ($\Delta x_2$ and $\Delta y_2$). The amounts of misregistration may, alternatively, be obtained on the basis of the misregistration marks 206c and 206d.

The compensating circuit 210 further obtains the difference between the amount of misregistration of the preceding PWB and that of the PWB and that of the subsequent PWB, and on the basis of this difference, the compressed data relating to the preceding PWB stored in the memory 222 are decoded in the decoding part 226 (step S34) so that the binary image signals relating to the preceding PWB are inputted in the comparator 224 as pixel signals. The step S34 is executed in synchronization with the inputting of the binary image signals relating to the subsequent PWB in the comparator 224.

A determination is made (step S35), in pixel-to-pixel correspondence, as to whether the signals inputted into the comparator 224 are the same. At the same time, the data to be stored in the memory 222 are rewritten from the compressed data relating to the preceding PWB to compressed data relating to the subsequent PWB (step S36).

The prescribed defect analyzing logic is applied in the defect detecting circuit 228, and the determination is made as to whether or not a pattern defect exists (step 36) by the defect detecting circuit 228. A signal corresponding to the result is outputted as a defect signal as information on coordinate positions of pixels (step S37).

Thereafter, when a pattern defect exists, the computer 232 outputs a marker control signal to the defect marker 319 (FIG. 11) at the prescribed time, whereby a mark is made (using ink, for example) on the surface of the PWB (step S38).

Each CCD camera 202 includes the image formation system 1 and the illumination system 20 illustrated in FIGS. 10A and 10B, whereby an effect similar to that of the second embodiment can be attained. Although a swell is frequently observed on a PWB surface, correct PWB inspection can be performed. Image data of the PWB can be incorporated into the control part without being adversely influenced by such a swell.

Although the above embodiments have been described with reference to inspection of PWBs, the present invention is not so restricted. The invention can be also used to inspect thick-film ICs, photomasks, reticules, thermal heads, liquid crystal members, and the like.

Further, the CCD cameras 202 need not use the image formation system 1 and the illumination system 20 of FIGS. 10A and 10B. As an alternative, the first embodiment may be used within the CCD cameras 202.

Although the present invention has been described and illustrated in detail, it is clearly understood that the same is by way of illustration and example only and is not to be taken by way of limitation. The spirit and scope of the present invention should be limited only by the terms of the appended claims.

WHAT IS CLAIMED IS:

1. An apparatus for forming an image of a first surface on a second surface with good depth of focus, even when said first surface is not flat, said apparatus comprising:
    (a) an objective lens for converging illuminating light from a light source onto a first surface, said objective lens having an optical axis;
    (b) an image formation lens for forming an image of said first surface on a second surface with light reflected from said first surface;
    (c) a quaterwave plate located on said optical axis; and
    (d) a polarizing plate located on said optical axis at a rear focal point of said objective lens, said polarizing plate including:
        (1) a non-polarizing region for transmitting said illuminating light and said reflected light; and
        (2) a polarizing region enclosing said non-polarizing region for transmitting said illuminating light and for obstructing a portion of said reflected light.

2. The apparatus of claim 1, wherein said quaterwave plate is located between said rear focal point of said objective lens and said objective lens.

3. An apparatus for forming an image of a first surface on a second surface, said apparatus comprising:
    (a) an illumination system, comprising:
        (1) a light source; and
        (2) a condenser lens and an objective lens for illuminating a first surface with an illuminating light beam from said light source;
    (b) an image formation system, comprising:
        (1) an image formation surface for receiving an image formation light beam reflected from said first surface; and
        (2) an image formation lens and said objective lens for transmitting said image formation light beam to form an image of said first surface on said image formation surface;
    (c) transmitting means for transmitting said illuminating light beam from said condenser lens to said objective lens and for transmitting said image formation light beam from said objective lens to said image formation lens; and
    (d) a quaterwave plate located between a rear focal point of said objective lens and said objective lens; and
    (e) a first polarizing plate located at said rear focal point of said objective lens, said polarizing plate including:
        (1) a non-polarizing region for transmitting said illuminating light and said reflected light; and
        (2) a polarizing region enclosing said non-polarizing region for transmitting said illuminating light and for obstructing a portion of said reflected light.

4. The apparatus of claim 3, wherein said objective lens has an optical axis, wherein said transmitting means is a beam splitter, said beam splitter being located on said optical axis of said objective lens.

5. The apparatus of claim 3, further comprising an equivalent neutral density filter, said filter having a transmittance, said polarizing region having a transmittance, said transmittance of said filter being substantially identical to said transmittance of said polarizing region, said filter covering said non-polarizing region.

6. The apparatus of claim 5, further comprising a second polarizing plate located between said light source and said beam splitter.

7. The apparatus of claim 3, wherein said objective lens has an optical axis, wherein said image formation surface includes an image pickup element, said image pickup element having a longitudinal axis, said quater-wave plate being rotated through an axis which is parallel to said longitudinal axis of said image pickup element to form an extremely small angle with respect to a plane which is perpendicular to said optical axis of said objective lens.

8. An optical system, comprising:
first transmitting means for transmitting a first light beam through a first location of an imaginary plane in a first direction such that said first light beam has a first effective width at said first location; and
second transmitting means for transmitting a second light beam in a second direction through said first location of an imaginary plane such that said second light beam has a second effective width at said first location, said second direction being substantially opposite to said first direction, said second effective width being smaller than said first effective width;
wherein said first and second transmitting means include a polarizing plate.

9. The optical system of claim 8, wherein said polarizing plate includes: (i) a non-polarizing region for transmitting said first light beam and said second light beam; and (ii) a polarizing region enclosing said non-polarizing region for transmitting said first light beam and for obstructing a portion of said second light beam.

10. The optical system of claim 9, wherein said polarizing plate is substantially perpendicular to said first and second directions.

11. The optical system of claim 10, further comprising a quarter-wave plate for modifying the polarization of said first and second light beams.

* * * * *